No. 812,114. PATENTED FEB. 6, 1906.
E. M. COOK.
METALLIC PACKING.
APPLICATION FILED JULY 18, 1905.
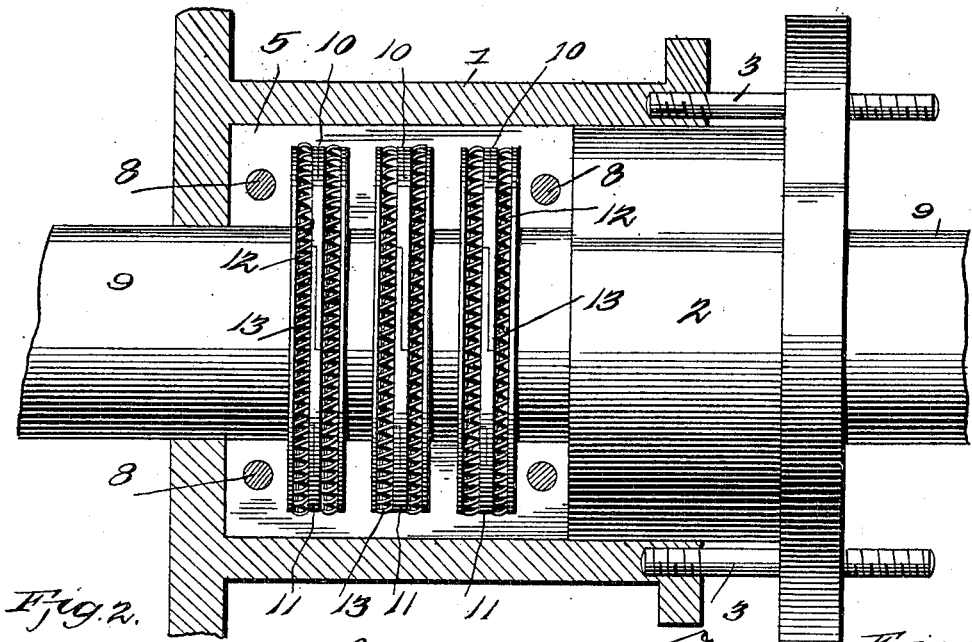
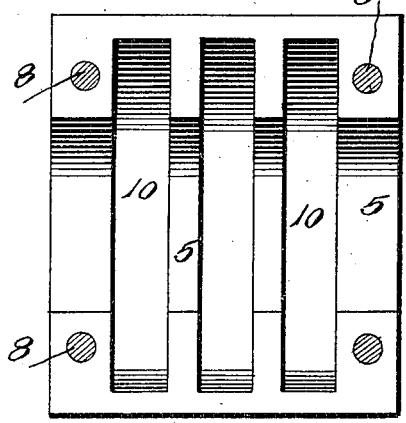
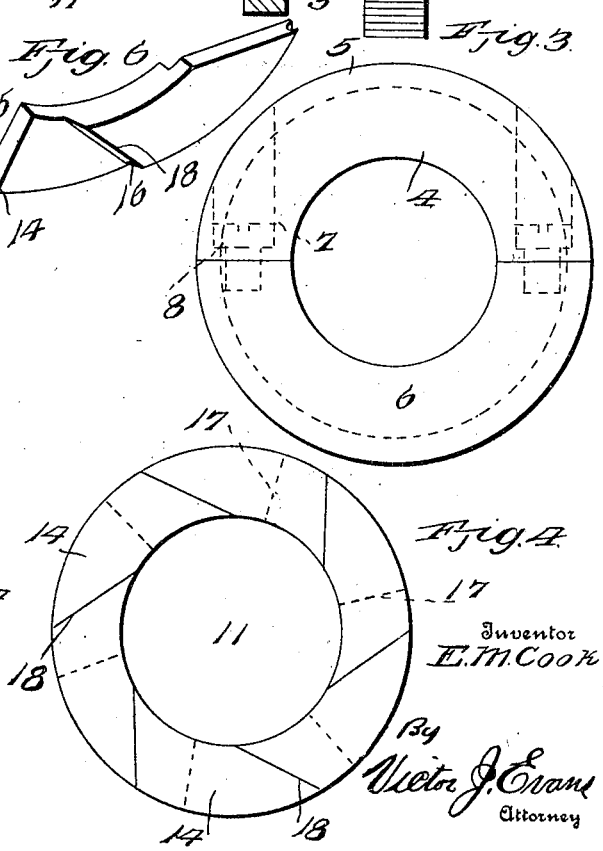
Witnesses
Frank W. Hough
C. C. Hines
Inventor
E. M. Cook
By Victor J. Evans
Attorney

UNITED STATES PATENT OFFICE.

EDWARD M. COOK, OF ELYRIA, OHIO.

METALLIC PACKING.

No. 812,114.  Specification of Letters Patent.  Patented Feb. 6, 1906.

Application filed July 18, 1905. Serial No. 270,206.

*To all whom it may concern:*

Be it known that I, EDWARD M. COOK, a citizen of the United States of America, residing at Elyria, in the county of Lorain and State of Ohio, have invented new and useful Improvements in Metallic Packings, of which the following is a specification.

This invention relates to metallic packings, particularly of that type employing expansible rings composed of adjustable segments held assembled and permitted to expand and contract by coacting springs, the object of the invention being to provide a packing-ring in which the segments are so joined as to permit of their free movement to compensate for wear, while maintaining them closely in assembled relation to form a close joint.

The preferred embodiment of the invention is shown in the accompanying drawings, in which—

Figure 1 is a longitudinal section through the receptacle and stuffing-box of the packing, the remaining parts appearing in elevation. Fig. 2 is an inner face view of one of the members of the box. Fig. 3 is a side view of the complete box. Fig. 4 is a side view of one of the packing-rings. Fig. 5 is an edge view of the same, and Fig. 6 is a detail view of one of the ring-segments.

The numeral 1 denotes the packing chamber or receptacle, 2 the usual sliding follower, and 3 adjusting-screws securing said follower to the receptacle. Disposed in the receptacle 1 is an annular box 4, composed of semicircular sections 5 and 6. One of these sections is formed with sockets 7 to receive fastening-screws 8, which enter threaded recesses in the other section and detachably connect said sections. The box surrounds the piston or other rod 9, which extends longitudinally through the receptacle and follower. The box-sections 4 and 6 are provided on the inner faces with matching recesses 10 to form annular grooves to receive the packing-rings 11, each of which is formed of a series of segments and provided on opposite sides of its center with annular grooves 12 to receive endless coiled springs 13, which hold the segments assembled and draw them together to compensate for wear. The rings encompass the rod 9 and are maintained in close engagement therewith by the springs.

Each segment 14 is composed of two members or parts 15 and 16, disposed in parallel relation and each integrally joined at its inner end to the inner end of the other, one set of members forming one side and the other set the opposite side of the body of the ring. The outer ends of the members 15 and 16 project in opposite directions, and the segments when assembled fit together in such manner as to break joint, thus holding them when coupled by the springs against lateral movement. The ends of one member are straight or extend approximately at right angles thereto or radially to the ring, as indicated at 17, while the ends of the companion member are respectively reversely beveled or inclined at angles which are tangential to the ring, as indicated at 18. The ends 17 thus constitute stops to limit the inward movement of the segments in the contraction of the ring, while the ends 18 form scarf-joints and contact-faces on which the segments are adapted to ride as the ring expands and contracts under variations of temperature and to compensate for wear. An exceedingly strong and durable construction of ring is thereby provided which is practically proof against leakage, as the lapping parts always form closed joints and the springs maintain the inner faces of the segments in snug contact with the rod.

Having thus described the invention, what is claimed as new is—

1. A packing-ring composed of a single set of segments having engaging ends, said ends being formed to provide radial cuts on one side and tangential cuts on the other side of the ring.

2. A packing-ring composed of segments, each having two integral portions, one set of portions of the several segments coöperating to form one half and the other set of portions the other half of the body of the ring, said portions of the segments having their ends constructed to respectively form radial cuts on one side and tangential cuts on the other side of the ring.

3. A packing-ring composed of a single set of segments having engaging ends, said ends being formed to provide radial cuts on one side and tangential cuts on the other side of the ring, said radial and tangential cuts being disposed upon lines between each other so as to break joint around the surface of the ring.

4. A packing-ring comprising segments, each composed of two parallel integral parts, one of said parts having its ends tangentially and the other radially beveled, irrespective tangentially and radially beveled parts of the several segments forming opposite sides of the body of the ring and tangential and radial cuts, the tangential cuts being disposed upon one side of the ring and the radial cuts upon the opposite side of the ring and on lines between said tangential cuts.

In testimony whereof I affix my signature in presence of two witnesses.

EDWARD M. COOK.

Witnesses:
H. W. INGERSOLL,
FLORENCE E. STETSON.